Feb. 12, 1929.

F. E. HUMMEL ET AL 1,701,677

MACHINE FOR PREPARING TOAST, TOASTED SANDWICHES,
BAKED WAFFLES, AND THE LIKE

Original Filed Jan. 6, 1925    3 Sheets-Sheet 1

Inventors:
Fred'k. E. Hummel.
John J. Noeth.
Milo B. Stevens Co.
Attorneys.

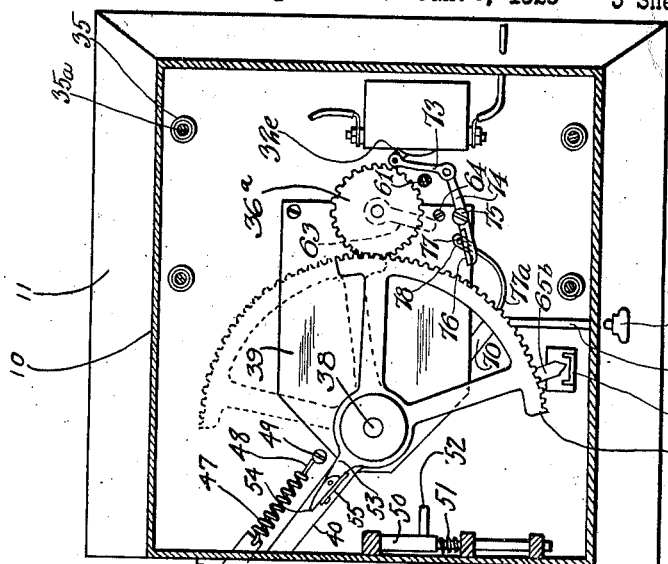

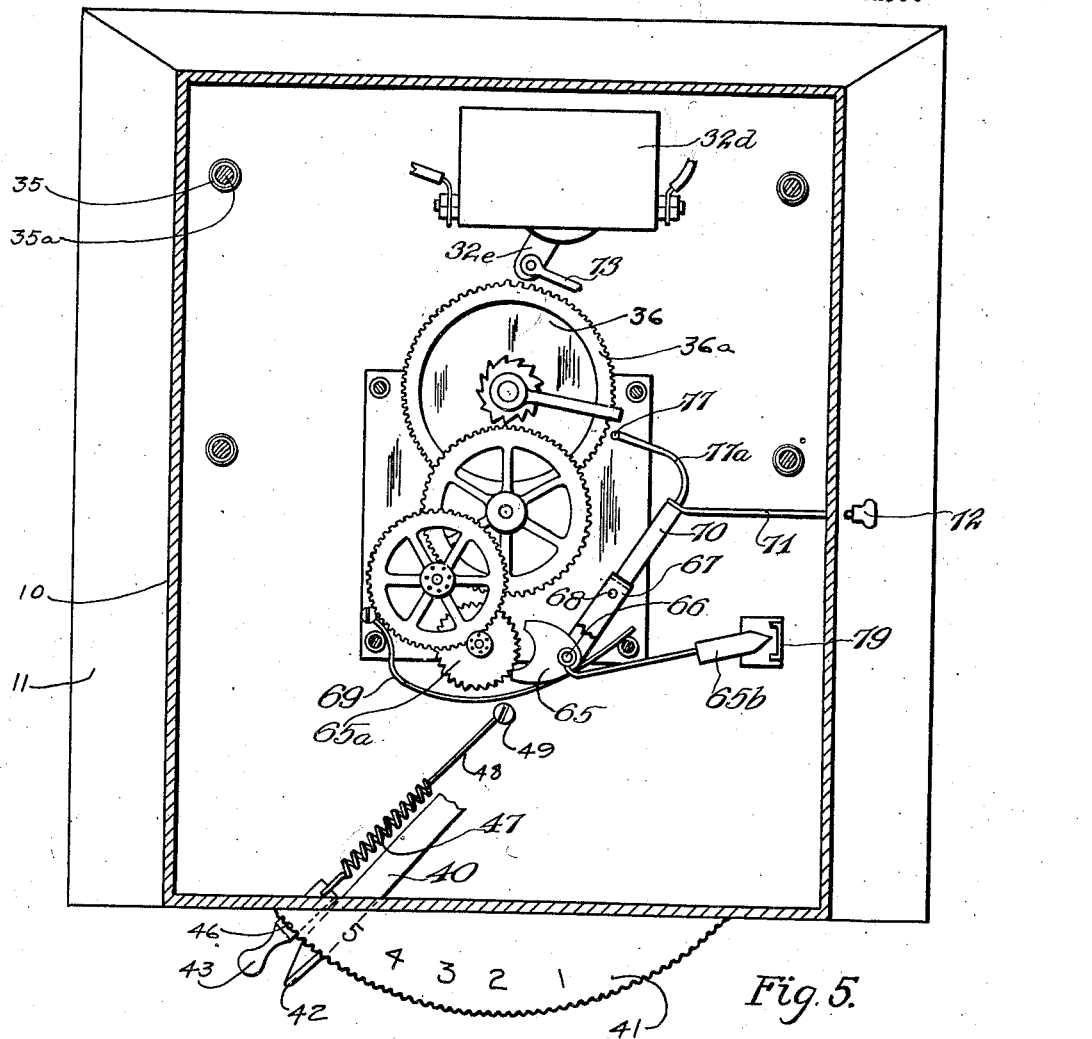

Patented Feb. 12, 1929.

1,701,677

UNITED STATES PATENT OFFICE.

FREDERICK E. HUMMEL AND JOHN J. NOETH, OF CHICAGO, ILLINOIS.

MACHINE FOR PREPARING TOAST, TOASTED SANDWICHES, BAKED WAFFLES, AND THE LIKE.

Application filed January 6, 1925, Serial No. 909. Renewed July 2, 1928.

This invention relates to heating devices of the type used in restaurants, lunch rooms and homes for the toasting of bread, sandwiches and the like, and its object is to provide a machine for this purpose which is self-contained and compact.

Another object of the invention is to provide a machine of this kind to which a special attachment may be applied to adapt it for the baking of waffles.

A further object of the invention is to so design the heating element of the machine as to heat both sides of the bread slice, sandwich or waffle concurrently, thereby saving time in that connection.

A still further object of the invention is to provide a machine of this type which operates by a simple, automatic clockwork mechanism, which is easily controlled and dependable.

Another object of the invention is to design it as a portable and independent machine, ready for operating at any place where electricity is available.

With these objects in view, and any others which may suggest themselves from the description and claims to follow, reference is had to the accompanying drawings forming a part of this specification, in which Figure 1 is an elevation of the novel machine, partly broken away;

Fig. 3 is a section on the line 3—3 of Fig. 2;

Fig. 4 is a section on the line 4—4 of Fig. 3;

Fig. 5 is a section on the line 5—5 of Fig. 3;

Fig. 6 is a perspective view of an escapement mechanism detail; and

Figure 1:
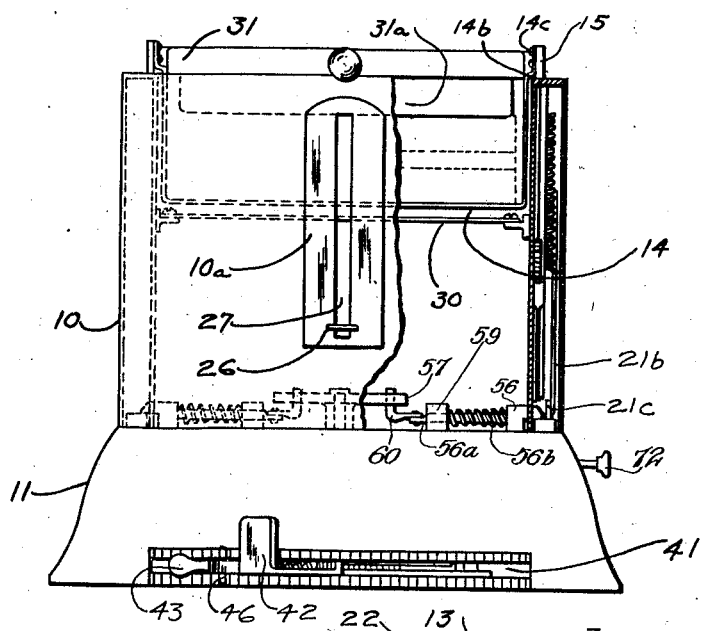

Referring specifically to the drawings, 10 denotes the housing of the machine, the same being made of heavy sheet metal and having a flared base 11. The latter is separated from the casing by a partition 12. For the present purpose the housing is rectangular in form—although form is a secondary consideration—and has an inner, continuous wall 13 which is spaced from the casing walls to permit the provision of a portion of the mechanism between the walls.

Inside the wall 13 is disposed a shallow tray 14, whose base is cut like a grid, as shown at $14^a$. This tray is designed to receive the bread slice or sandwich to be toasted, and is in sunken position as denoted by full lines during the toasting or heating action. However, when the contents are to be removed or replaced, the tray is adapted to be lifted to a high position—per dotted lines in Fig. 3—to facilitate access thereto. This action is accomplished by the following arrangement: The tray 14 is formed with upward bends $14^b$ on opposite sides, and the ends of these are attached by screws $14^c$ to a pair of vertical gear-racks 15. These are dropped through slots 16 in a top rim 17 connecting the two casing walls to lie next outside the inner wall 13 in a position to slide in vertical guides 18 carried by the same. One edge of each rack 15 is cut with gear teeth, and the corresponding guide 18 is cut away thereat to permit the meshing with the rack of a gear sector 19 which is pivoted to the inner wall as indicated at 20. The sweep of the two gear sectors 19, therefore operates the racks 15, the sectors themselves being raised by a pair of side bars 21. These are pivoted at one end to a common shaft 22 and are slotted intermediately at 23 to receive a wrist-pin 24 from each gear sector 19. The side bars are united at the front to form a crosspiece $21^a$ which is used as an abutment to depress the side bars against the tension of a coil spring 25 depending from the wall 13 to each bar. The actuator inducing this action is a finger piece 26 handily located at the front of the machine, this finger piece passing through a vertical slot 27 in the front wall of the outer housing 10—which may be reinforced by a plate $10^a$—and seating on the crosspiece 21 as indicated in Fig. 3. The finger piece has a depending hook bar 28 which has for one of its objects to steady the motion of the finger piece in the slot 27 through the co-operation of guide ribs 29 inside the frontal housing wall. The tendency of the tray 14 is, due to the springs 25, to rise to the high position mentioned, but during the heating operation the tray is held down through the agency of the hook bar 28, as will be later explained. For heating purposes while the tray is in lowered position, a stationary electrical heating element 30 is positioned under the tray, this element being preferably of flat design, and laterally distributed to furnish uniform heat over a large area.

Co-operating with the arrangement of the tray 14 is a device for furnishing heat over the contents of the tray. A slice of bread placed in the latter would thus receive heat on both sides at the same time. A top frame 31 is provided with a heating element 31ª identical with that under the tray—and therefore not shown in detail—such top frame having a frontal knob 31ᵇ whereby it may be manually raised from the low, full-line position in Fig. 1 to the high, dotted-line position of Fig. 3. The object of raising the top frame in this manner is to create an opening for the insertion of a slice of bread of any given thickness upon the tray; and the high position of the frame as evident in Fig. 3 makes sufficient room for the insertion of the average sandwich, whereby the novel machine may be readily adapted to the modern custom of toasting sandwiches as a whole to improve the flavor of the food therein as well as cause such flavor to permeate the bread as it is toasted.

The heating elements 30 and 31ª are supplied by a current wire 32 leading from a suitable tap and provided with a switch 32ᵈ and branches 32ª and 32ᵇ, leading to the respective elements. Since the element 30 is stationary, the branch 32ª is short, but the branch 32ᵇ is of necessity formed with an intermediate coil 32ᶜ to allow for the rise of the element 31ª as described.

The top frame 31 is carried by two vertical bars 33 inside the rear corners of the housing, being hingedly connected at 33ª to such bars to also permit the frame to be swung up and back out of the way preparatory to the insertion or removal of a sandwich or bread slice. The bars 33 and the frame 31 are made with shoulder stops 33ᵇ and 31ᶜ, respectively, to limit the drop of the frame to a horizontal limit and its upward swing to a point beyond a vertical position to assume a position of rest. The electrical current feed branch 32ᵇ will be of stranded wire cord, which is very flexible and will not be affected by the rising or swinging action of the top frame 31. Each of the bars 33 descends through the top rim 17 of the housing to form a rectangular frame 33ᶜ adapted to slide vertically along the rear inner wall 13 between a side flange 13ª thereof and the contiguous rack-bar guide 18, the sliding action being facilitated by rolls 33ª carried by the side pieces of the frame 33ᶜ. The assembly of the bars 33 is not attached to any other mechanism, and is therefore free to drop of its weight until each frame 33ᶜ rests on a narrow shelf 34 supported by two vertical coil springs 35. The latter rest on the floor 11ª of the base 11, and their tendency is expansive whereby to bear upon the shelf 34 when released from the compressed condition shown in Fig. 3. The upper ends of the springs 35 are secured to pins 35ª descending from the shelf into them for guidance, and the partition 12 is made with openings 12ª to let the springs freely expand through them when released. A branch 21ᵇ of each of the side bars 21 is dropped to its proximate shelf 34 to bear down on the same when the side bars are depressed and to permit the shelf to follow when these are released. To avoid friction and binding, the branches 21ᵇ are equipped with rollers 21ᶜ at the point of contact with the respective shelves 34. The controls for and the function of the shelves 34 and springs 35 will be explained presently.

In order that the parts yet to be described may, in conjunction with those already made known, operate to make the machines automatic, whereby the heating operation may cease after a predetermined period and the food placed—in toasted condition—where it may be handily removed ready to serve, a peculiar clockwork mechanism is employed and will now be described.

The clockwork mechanism referred to is contained in the base 11 of the machine, and consists mainly of a spring motor 36 wound by an external gear 36ª. The latter is operated by a sector gear 37 pivoted at 38 on the roof 39 of the motor and having a lever extension 40 beyond the pivot. Full lines in Fig. 4 indicate that the sector gear 37 is in a position where it has fully wound the motor; and finely dotted lines indicate the opposite extreme.

The lever extension 40 of the sector gear 37 drops to the floor of the base 11 and passes through a wide slot 41 in the front wall of the same to be fashioned into a handle 42. The lever is designed to swing through this slot from its right-hand end toward the left-hand end when to wind the motor, the sweep being limited by a stop 43. This stop is a lug positioned laterally of the lever extension 40 between the floor of the base 11 and a segment-shaped ledge 44 forming the roof of the slot 41. The base floor is cut to match the contour of the ledge, and both are cut with a series of registering notches 45 into a selected pair of which a stud 46 passing through the stop 43 is receivable. To favor such a setting, the stop is drawn inwardly by a spring 47 anchored by a wire 48 to a floor stud 49 at a central point inside the housing 11. By means of a handle bend 43ª of the stop 43, the latter may be drawn out slightly to release it from a given pair of notches 45 and moved to a different pair, whereby the sweep of the lever extension 40 and in turn the extent of winding the motor are regulated. With the segment-ledge 44 graduated to correlate given notches with periods of time for the toasting of the food it will be seen that the stop 43 will serve as a simple indicator to limit the activity of the motor mechanism to any predetermined period of time.

The automatic connection between the motor and the operating mechanism for the tray 14 will now be described. The hook bar 28 previously considered as allied with the tray actuator descends into the base 11, and is cut with a side notch 28ª before it is tapered to form its lower extremity. Adjacent to the latter the frontal base wall carries a sliding latch bolt 50 advanced by a spring 51 to seat in the notch 28ª of the hook bar 28 and thus hold the latter down. The latch bolt has a side pin 52 in the path of a finger 53 carried by the sector gear 37 whereby the travel of the latter to finely-dotted position of Figure 4 will cause the finger 53 to strike the pin 52, thus backing the latch bolt 50, and wipe past the pin, as also indicated by finely-dotted lines. The finger 53 has a knuckle-joint pivot 54, maintained by a leaf spring 55, whereby the finger may break on the return sweep to clear the pin 52.

To operate the device to the extent described, the top-frame 31 and the tray 14 must initially be in elevated position, the handle 42 of the lever extension 40 at the beginning of its stroke, and the stop 43 set at a point corresponding to the number of minutes desired for the toasting operation. The manner in which the top frame 31, the tray 14 and the handle 42 may attain the initial positions indicated will presently become evident, but let it be now assumed that these parts are in such positions. Therefore, to start, the top frame 31 is swung up by means of its knob 31ᵇ, and a slice of bread or a sandwich deposited in the tray 14. The top frame is now swung back to normal position, which will as yet be a considerable space above the contents of the tray 14. The finger piece 26 is now depressed all the way down, this action causing the hook bar 28 to first crowd and then receive the latch bolt 50 in its notch 28ª, whereby said hook bar is caught and the finger piece 26 held down. The descent of the finger piece, acting through the crosspiece 21ª and the side bars 21, causes the gear sectors 19 to depress the gear racks 15, thereby lowering the tray 14 to a position immediately over the heating element 30. The downward movement of the side bars 21 also acts, through the branches 21ᵇ thereof, to depress the shelves 34 to lowermost position—against the tension of the supporting springs 35—whereby the assembly of the top-frame 31, bars 33 and their frames 33ᶜ is free to drop of its weight until the top frame rests on the bread slice or sandwich in the tray. The machine is thus self-adjusting to bread slices or sandwiches of any height within customary limits. The contents of the tray are now also covered by the heating element 31ª and in position to be toasted. The handle 42 for the winding of the spring motor 36 is drawn to the left until it abuts the stop 43, this action not affecting the hold of the latch bolt 50 on the hook bar 28, since the finger 53 slips by the bolt pin 52 on the winding stroke, as previously indicated. When the handle 42 is released it immediately starts on its return stroke, due to the unwinding of the spring.

The return stroke is, however, regulated by the effect of a governor 65ᵇ on the escapement 65 of the spring motor, whereby the return occurs at a predetermined rate. This rate is of course calculated in minutes to agree with the readings on the ledge 44, the governor being adjusted until the proper retarding effect is had on the escapement. When the handle 42 has returned to its point of origin the finger 53 will have impinged on the latch bolt 50 to release the vertical hook bar. The latter will immediately rise due to the pull of the springs 30 on the parts 21, 21ª, causing a reversal of the action with respect to the gear sector 10 and gear racks 15, whereby the tray 14 is raised to its initial position, within handy reach for the removal of its contents. At the same time, the rise of the side bars 21 and their branches 21ᵇ relieves the shelves 34 whereby the supporting springs 35 thereof boost them, raising the assembly of the bars 33, top frame 31, etc. sufficiently for the uncovering and removal of the tray contents. This boosting action is, however, made to occur a trifle late by the employment of an auxiliary mechanism which functions as follows in connection with the shelves 34: It will be recalled that the depression of the finger piece 26 to put the machine in action caused the shelves 34 to be depressed in turn by the wheeled sidebar branches 21ᵇ to lowermost position against the tension of the supporting springs 35. Now, as the shelves approach the end of their descent, they crowd and let snap over them a pair of beveled latch-bolts 56 movable transversely across the partition 12. These bolts extend in opposite directions from a horizontal disk 57 eccentrically mounted on a stud 58 secured medially in the partition, the disk being however free to turn on the stud. The latch-bolt shanks 56ª are slidable in bearing blocks 59 mounted on the partition, and outwardly urged by springs 56ᵇ coiled about such shanks. The inner ends of the latter are connected to the disk 57 by pivoted links 60. Near its periphery the disk carries a pin 61 which depends through an arcuate slot 62 in the partition 12 to a point within the sweep of a radial finger 63 carried by the shaft 36ᵇ of the spring motor 36. Now, the winding capacity of the motor is fixed at the source to limit the maximum sweep of the hand lever 42, such capacity being represented by nearly a full revolution of the motor shaft 36ᵇ, as determined by the travel of the radial finger 63 from and around to a screw 64 depending from the clockwork-frame roof as an abutment, or both the origin and goal for such finger 63 as it moves around in the winding and unwinding directions. Now, as the finger intercepts the depending pin 61 of the eccentric disk 57 at a point near the end of its return travel it impinges on such pin until it succeeds in wiping past. The movement undergone by the pin 61 carries the eccentric disk 57 laterally a short space, drawing on the links 60 to retract the latch bolts 56 and release the shelves 34 for complete boosting action of the springs 35.

As a result of the above actions, the tray 14 bearing the bread slice or sandwich receives the first lifting impulse, whereby it lifts the top-frame 31 as well, since the latter rests of its weight on the tray contents. The combined movement of the tray and top frame, thus serves to keep the tray contents from being tossed out of place and also helps to conserve the heat accumulated thereby. However, as soon as the tray 14 has had a rising start, the releasing action of the latch-bolts 56 upon the shelves 34 allows the power of the springs 35 to come to the aid of the rising supports 33$^c$ of the top frame 31 for a more assured ascent thereof to the position denoted by dotted lines in Fig. 3.

The heating unit is of course turned on and off autoamtically in synchronism with the major operations described above, and the controls involved in that connection will now receive attention. As is noted, the electric switch 32$^d$ is located in proximity to the spring motor 36, and has a rounded lever 32$^e$ which swings laterally in one or the other direction to the "on" or "off" position. This type of switch is popularly known and employed, and its lever requires but a partial urge to cause it to swing over, the switch having a spring which takes up and completes the stroke of the lever. This property of the switch is utilized by designing the radial finger 63 of the spring motor shaft 36$^b$ to impinge upon and wipe by the switch lever 32$^e$ as it approaches or leaves its goal, per previous explanation.

Where the operation of the appliance has been started as described, but must be suddenly interrupted due to a mistake, a change in the order or some unexpected development, a device is provided to immediately release the spring motor by the simple push of a button. It will be noted that the escapement 65 of the spring motor is carried by a spindle 66 supported by a frame 67 pivoted on a post 68. A floor spring 69 normally presses the frame so as to urge the escapement against its wheel 65$^a$. The frame 67 has an extension 70 beyond its pivot post 68 to which is linked a push rod 71, headed by a button 72 outside the casing 10 of the appliance at the right. It will be obvious that pressure on the button 72 will cause the escapement 65 to swing away from its wheel 65$^a$, permitting the summary release of the spring and in turn the restoration of the parts to initial position by means already familiar. This summary release device is, due to its quick action, also connected to the ordinary mechanism, to be operated by the switch lever 32$^e$. As noted in Figs. 4 and 5, a link 73 runs from the switch lever to a lever 74 medially pivoted at 75 on the roof of the spring motor frame. The free end of the lever 74 is made with an upward flange 76 along which lies an upward bend 77 of a stem 77$^a$ leading from the extension 70 of the escapement frame 67, a slot 78 being cut in said roof to permit the entry and free action of the bend 77. Now, when the switch lever 32$^e$ swings from the present ("on") position to the "off" position, it also swings the lever 74, whereby the latter impinges the bend 77, duplicating the effect of the emergency button 72 on the extension 70 and the parts allied therewith.

The governor 56 is a weighted stem carried by the escapement 65, and when the latter recedes as last explained, the weight of the governor will advance into a flanged check-plate 79, which will confine it to prevent erratic vibration thereof with possible harm to the delicate escapement when the spring motor is suddenly caused to unwind as described.

Figure 2:
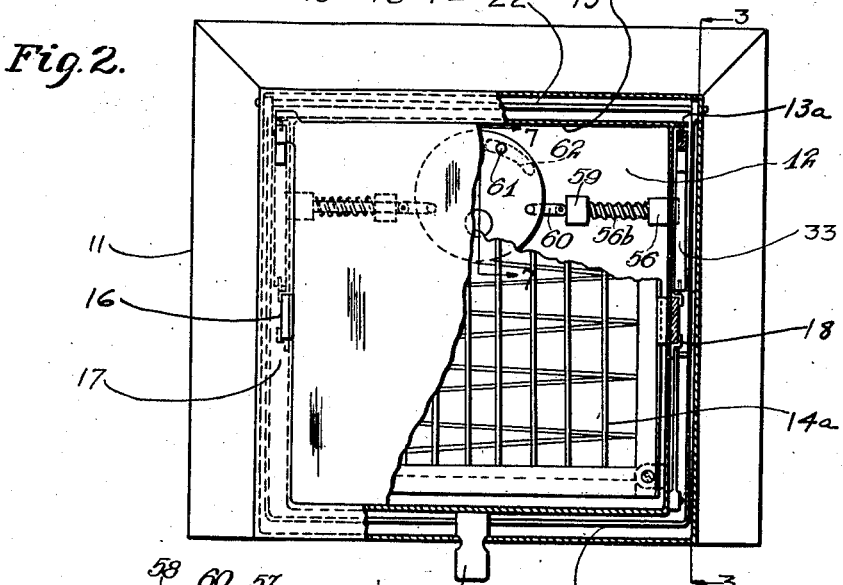
Fig. 2 is a plan view, also partly in section.
Figure 7:
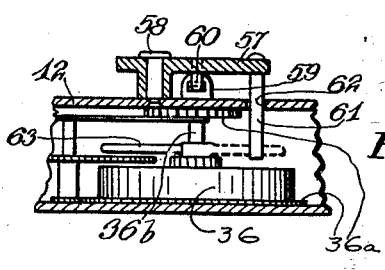
Fig. 7 is a sectional detail on the line 7—7 of Fig. 2.

As noted in Fig. 2, the frontal edge of the tray 14 is not flanged but plain, in order that the toast or toasted sandwich may be slid off the tray when wanted, without danger of the fingers touching the hot tray or the necessity of using an implement to remove the contents thereof. When elevated, the tray will of course be even with or above the top of the housing to facilitate loading or unloading as contemplated.

It will be seen that the novel appliance though small, compact and readily portable, performs automatically what has heretofore required personal attention, some skill, and a considerable loss of time. In fact, the treatment of the contents is superior to the customary toasting process, due to the oven-like housing in which the heat is uniformly distributed. Also, while appliances in general use toast but one side of the bread or sandwich at a time, the present appliance treats both sides at the same time, effecting a considerable saving of time, and doing away with task of turning and the necessity of watching for the proper time to turn. The automatic time-controlled feature of our appliance assures the toasting of the contents only to a desired degree, as readily regulated by the initial setting at the front of the machine, thereby precluding burning. In this connection, our elevating mechanism is designed to remove the toast or toasted sandwich from the proximity of the electric heating elements at the proper time, so that residual heat in such elements may not unnecessarily prolong the process with possible detrimental effect. Further, our machine is peculiarly designed for the toasting of sandwiches for the principal reason that the sandwich is always received, toasted and held in readiness for removal in horizontal position, thus facilitating handling by the attendant, keeping the contents of the sandwich from sliding or dropping out, and promoting the impregnation of the toast with the juices, vapors or aroma of the sandwich contents. Due to the weight of the top-frame, the bread slice or sandwich is held in flat position, facilitating even toasting and preventing warping tendencies.

With the design and operating scheme of the novel toasting machine in mind, the substitution of a set of waffle irons for the toasting unit is easily conceivable, preferably as an auxiliary attachment for use when the occasion demands; and, since this modification may be made without the exercise of invention by one skilled in the art, it is not deemed necessary to illustrate it in the accompanying drawings or to dwell on it in detail.

We claim:

1. A toasting machine for a bread slice, sandwich or like food article comprising a support to seat such article in substantially horizontal position, a heating element effective toward the bottom of the article, another heating element effective toward the top of the same, automatic means for elevating said support and latter mentioned heating element at relative rates of motion to locate the article remotely from the heating elements, and a hinge support for the upper heating element whereby it may be swung back to clear the approach to the article.

2. An automatic food-article heating machine comprising a housing, an article support in the latter, a fixed heating element under the support, a movable heating element over the latter, means for elevating the support to expose the article thereon above the housing, an automatic control for such means, a manual actuator and control for the lowering of the support and a regulator for such automatic control.

3. An automatic food-article heating machine comprising a housing, an article support in the latter, a fixed heating element under the support, a movable heating element over the latter, means for elevating the support to expose the article thereon above the housing, means for elevating said movable heating element, an automatic control for each of said elevating means, a manual actuator and control for the lowering of the support, and a regulator for such automatic control.

4. An automatic food-article heating machine comprising a housing, an article support in the latter, a gearing to lower or raise said support, a manually operated push rod to actuate said gearing for the lowering action, a latch to hold the push rod in advanced position, a motor gearing adapted to trip said latch for the release of the push rod, automatic means to induce the rise of the support in such event, a regulator for such motor gearing, a stationary heating element under the support, a movable heating element above the same, a gearing to elevate the movable heating element and a control carried by said motor gearing whereby to induce the operation of said elevating gearing.

5. An automatic food-article heating machine comprising a housing, an article support in the latter, a fixed heating element under the support, a movable heating element over the latter, an automatic gearing to elevate the support, an automatic gearing to elevate the movable heating element, a manual control for the two gearings, a motor actuator to release the same for action, and a regulator for such motor actuator.

6. An automatic food-article heating machine comprising a housing, an article support in the latter, a fixed heating element under the support, a movable heating element over the latter, an automatic gearing to elevate the support, an automatic gearing to elevate the movable heating element, a push rod manually depressible to cause said gearings to remain inactive, a motor, latch devices operable by said motor to trip said push rod and said second-mentioned gearing respectively whereby to release both gearings for action, and a regulator for said motor.

7. An automatic food-article heating machine comprising a housing, an article support in the latter, a fixed heating element under the support, a movable heating element over the latter, an automatic gearing to elevate the support, an automatic gearing to elevate the movable heating element, a push rod manually depressible to cause said gearings to remain inactive, a motor, latch devices operable by said motor to trip said push rod and said second-mentioned gearing respectively whereby to release both gearings for action, and a regulator for said motor, the latch device corresponding to the second-mentioned gearing being timed independently of the other latch device.

8. An automatic food-article heating machine comprising a housing, an article support in the latter, a fixed heating element under the support, a movable heating element over the latter, an automatic gearing to elevate the support, an automatic gearing to elevate the movable heating element, a push rod manually depressible to cause said gearings to remain inactive, a motor, latch devices operable by said motor to trip said push rod and said second-mentioned gearing respectively whereby to release both gearings for action, a control switch for the heating elements, a motor-operated lever to open or close such switch, and a regulator for said motor.

9. An automatic food-article heating machine comprising a housing, an article support in the latter, a fixed heating element under the support, a movable heating element over the latter, an automatic gearing to elevate the support, an automatic gearing to elevate the movable heating element, a push rod manually depressible to cause said gearings to remain inactive, a motor, latch devices operable by said motor to trip said push rod and said second-mentioned gearing respectively whereby to release both gearings for action, a control switch for the heating elements, a motor-operated lever to open or close such switch, and a regulator for said motor, the latch device corresponding to the second-mentioned gearing being timed independently of the other latch device.

10. The combination with a food-article support and overhead heating element therefor held down under tension by a latch gearing; of a releaser for said latch gearing comprising a spring motor, a winding element, a gearing driven in one direction by the winding element and in the opposite direction by the unwinding of the motor, a variable stop to limit the progress of the winding element, a governor to limit the unwinding action of the motor to a predetermined rate, a finger carried by the second-mentioned gearing to trip the latch gearing during the unwinding course, a control switch for said heating element, and a lever carried by the said second-mentioned gearing to close such switch during the winding course and open the same during the unwinding course.

11. A toasting machine for a bread slice, sandwich or like food article comprising a support to seat such article in substantially horizontal position, a fixed heating element under such support, an upper heating element adapted to seat of its weight on the food article, and having an overhanging section, a spring-boosted platform below said overhanging section, a depressor for such platform to permit the free fall of said overhanging section as limited by the height of the food article on the support, a latch to lock the platform in depressed position, and means to trip said latch whereby the platform may be boosted to lift the upper heating element to a position high above said food article.

12. A toasting machine for a bread slice, sandwich or like food article comprising a support to seat such article in substantially horizontal position, a fixed heating element under such support, an upper heating element adapted to seat of its weight on the food article, and having an overhanging section, a spring-boosted platform below said overhanging section, a depressor for such platform to permit the free fall of said overhanging section as limited by the height of the food article on the support, a latch to lock the platform in depressed position, a manually wound spring motor, and a lever carried by the latter to trip said latch during the unwinding course of the motor whereby the platform may be boosted to lift the upper heating element to a position high above said food article.

13. A toasting machine for a bread slice, sandwich or like food article comprising a support to seat such article in substantially horizontal position, a fixed heating element under such support, an upper heating element adapted to seat of its weight on the food article, and having an overhanging section, a spring-boosted platform below said overhanging section, a depressor for such platform to permit the free fall of said overhanging section as limited by the height of the food article on the support, a latch to lock the platform in depressed position, a manually wound spring motor, a lever carried by the latter to trip said latch during the unwinding course of the motor whereby the platform may be boosted to lift the upper heating element to a position high above said food article, and a variable stop to limit the progress of the winding element.

In testimony whereof we affix our signatures.

FREDERICK E. HUMMEL.
JOHN J. NOETH.